United States Patent
Mitchell et al.

(10) Patent No.: US 10,221,956 B2
(45) Date of Patent: Mar. 5, 2019

(54) FILTER ASSEMBLY FOR A BEVERAGE DISPENSER

(71) Applicant: General Electric Company, Schenectady, NY (US)

(72) Inventors: Alan Joseph Mitchell, Louisville, KY (US); Jeffrey Charles Mellinger, Louisville, KY (US); Wade Antoine Powell, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 241 days.

(21) Appl. No.: 14/987,101

(22) Filed: Jan. 4, 2016

(65) Prior Publication Data
US 2017/0188745 A1 Jul. 6, 2017

(51) Int. Cl.
*F16K 24/04* (2006.01)
*A47J 31/60* (2006.01)
*F16K 27/02* (2006.01)
*A47J 27/21* (2006.01)
*B01D 35/153* (2006.01)

(52) U.S. Cl.
CPC ........... *F16K 24/042* (2013.01); *A47J 31/605* (2013.01); *F16K 27/0209* (2013.01); *A47J 27/21183* (2013.01); *B01D 35/153* (2013.01); *F16K 24/044* (2013.01)

(58) Field of Classification Search
CPC .............. A47J 27/21183; A47J 31/0605; A47J 31/605; F16K 15/02; F16K 15/021; F16K 15/06; F16K 17/42; F16K 24/04; F16K 24/042; F16K 24/044; Y10T 137/053; Y10T 137/3087; Y10T 137/3099; Y10T 137/3143; Y10T 137/7358; Y10T 137/7423; Y10T 137/7426; Y10T 137/86324; Y10T 137/86332
USPC .... 137/15.26, 198, 202, 213, 409, 429, 430, 137/587, 588, 613; 141/59, 198, 202, 141/224; 220/745, 746
See application file for complete search history.

(56) References Cited

U.S. PATENT DOCUMENTS

| | | | | |
|---|---|---|---|---|
| 540,760 A | * | 6/1895 | Sawyer | F24D 19/081 137/186 |
| 925,859 A | * | 6/1909 | Axford | F24D 19/081 137/198 |
| 1,086,215 A | * | 2/1914 | Porter | F24D 19/081 137/198 |
| 1,673,220 A | * | 6/1928 | Beard | F24D 19/081 137/198 |
| 1,918,980 A | * | 7/1933 | Nugent | B01D 25/24 210/130 |
| 2,908,282 A | * | 10/1959 | Maisch | F16K 24/04 137/199 |
| 4,209,032 A | * | 6/1980 | Drori | F16K 24/042 137/202 |

(Continued)

*Primary Examiner* — William McAlister
*Assistant Examiner* — Richard K Durden
(74) *Attorney, Agent, or Firm* — Dority & Manning, P.A.

(57) ABSTRACT

A filter assembly includes a vent system. The vent system includes an inner standpipe, a check valve, an outer standpipe and a cover. A sidewall of the check valve extends around the inner standpipe, and an end wall of the check valve is positioned over the inner standpipe. A sidewall of the cover extends around the outer standpipe, and an end wall of the cover is positioned over the outer standpipe.

22 Claims, 6 Drawing Sheets

(56) References Cited

U.S. PATENT DOCUMENTS

| | | | |
|---|---|---|---|
| 4,527,467 A * | 7/1985 | Siemensma | A47J 31/0605 210/474 |
| 4,759,474 A | 7/1988 | Regunathan et al. | |
| 6,708,713 B1 * | 3/2004 | Gericke | B60K 15/03519 137/202 |
| 7,419,591 B2 | 9/2008 | Aberle et al. | |
| 2014/0144824 A1 | 5/2014 | Shaffer | |

* cited by examiner

FILTER ASSEMBLY FOR A BEVERAGE DISPENSER

FIELD OF THE INVENTION

The present subject matter relates generally to filters, such as water filters for beverage dispensers.

BACKGROUND OF THE INVENTION

Single serve beverage dispensers (SSBDs) are increasingly popular and have become ubiquitous on kitchen countertops. Certain SSBDs are loaded with capsules or pods that allow users to brew or mix an individual-size, unique, hot or cold beverage. Thus, SSBDs may provide a single cup of coffee to users who do not consume or desire an entire pot of coffee. In order to provide single beverages, SSBDs generally dispense small volumes of liquid (e.g., between eight and sixteen ounces) for each beverage. To permit consecutive preparation of beverages and decrease preparation time, certain SSBDs include a removable storage reservoir. The storage reservoir is generally sized to between four and eight dispenses worth of water therein.

A filter may be provided within the reservoir over an outlet of the reservoir to filter contaminants from the water within the reservoir. Filtering water from the reservoir prior to supplying the water to the SSBD can improve performance of the SSBD and taste of a dispensed beverage. For the filter to perform well, air trapped inside the filter is preferably purged from the filter. Purging the air can assist with increasing an area of a filter medium exposed to water in the filter. However, purging air from a top portion of the filter can be difficult.

Accordingly, a filter assembly for a beverage dispenser with features for purging air from the water filter assembly would be useful.

BRIEF DESCRIPTION OF THE INVENTION

The present subject matter provides a filter assembly with a vent system. The vent system includes an inner standpipe, a check valve, an outer standpipe and a cover. A sidewall of the check valve extends around the inner standpipe, and an end wall of the check valve is positioned over the inner standpipe. A sidewall of the cover extends around the outer standpipe, and an end wall of the cover is positioned over the outer standpipe. Additional aspects and advantages of the invention will be set forth in part in the following description, or may be apparent from the description, or may be learned through practice of the invention.

In a first exemplary embodiment, a filter assembly is provided. The filter assembly includes a casing that extends between a top portion and a bottom portion. The casing defines an interior chamber. A filter medium is disposed within the interior chamber of the casing. A vent system is positioned at the top portion of the casing. The vent system includes an inner standpipe that defines a channel that is contiguous with the interior chamber of the casing. A check valve includes a sidewall and an end wall. The sidewall of the check valve extends around the inner standpipe. The end wall of the check valve is mounted to the sidewall of the check valve such that the end wall of the check valve is positioned over the inner standpipe. An outer standpipe extends around the sidewall of the check valve. A cover includes a sidewall and an end wall. The sidewall of the cover extends around the outer standpipe. The end wall of the cover is mounted to the sidewall of the cover such that the end wall of the cover is positioned over the outer standpipe.

In a second exemplary embodiment, a filter assembly is provided. The filter assembly includes a casing that defines an interior chamber. A filter medium is disposed within the interior chamber of the casing. A vent system is mounted to the casing. The vent system includes an inner standpipe that defines a channel in fluid communication with the interior chamber of the casing. An outer standpipe is spaced apart from the inner standpipe. A check valve includes a sidewall and an end wall. An inner surface of the sidewall of the check valve faces the inner standpipe. The end wall of the check valve is mounted to the sidewall of the check valve and is positioned over the inner standpipe. The sidewall of the check valve is disposed between the inner standpipe and the outer standpipe. A cover includes a sidewall and an end wall. An inner surface of the sidewall of the cover faces an outer surface of the outer standpipe. The end wall of the cover is mounted to the sidewall of the cover and is positioned over the outer standpipe.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
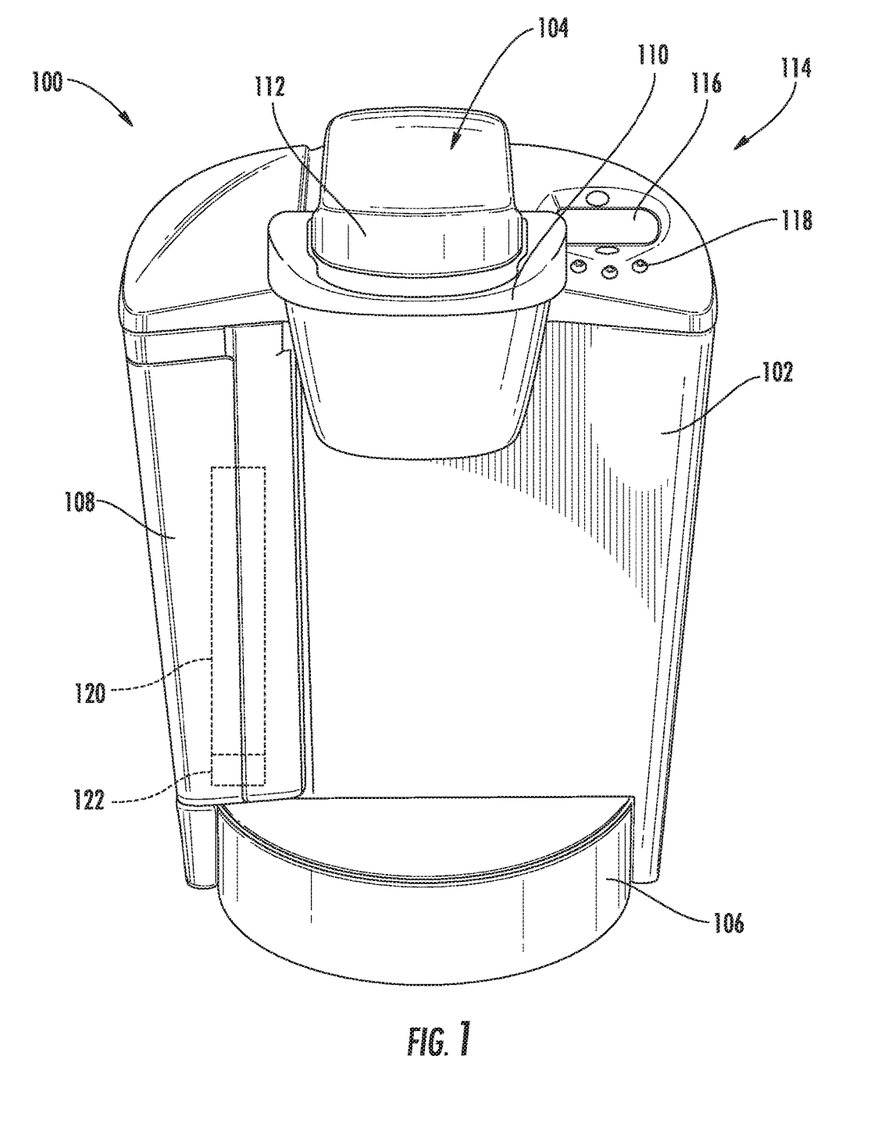
FIG. 1 provides a front, perspective view of a beverage dispenser according to an exemplary embodiment of the present subject matter.

FIG. 1 provides a front, perspective view of a beverage dispenser 100 according to an exemplary embodiment of the present subject matter. Beverage dispenser 100 is generally referred to as a "single serve beverage dispenser 100" and receives capsules or pods with flavorings therein that are brewed or mixed with hot or cold water to provide a hot or cold beverage, as desired. As an example, beverage dispenser 100 may be a KEURIG, brand single-cup coffee brewing system or a VERISMO™ brand single-cup coffee brewing system. However, beverage dispenser 100 may alternatively be any other suitable beverage dispenser.

As may be seen in FIG. 1, beverage dispenser 100 includes a body 102, a dispenser portion 104, a pan or tray 106, and a reservoir 108. A lever 110 is provided with dispenser portion 104 to allow a user to open a lid 112 of dispenser portion 104 and access a receptacle (not shown) for receiving a capsule or pod. During brewing or mixing operations, water may be taken from reservoir 108, heated or cooled, and provided to dispenser portion 104, wherein dispenser portion 104 either brews or mixes the water with the contents of the capsule or pod to provide a desired beverage. The beverage may be dispensed into a cup or mug (not shown) placed on tray 106 by a user. Beverage dispenser 100 also includes a control panel 114 including a display 116 and a plurality of user inputs 118 allowing the user to control operation of beverage dispenser 100.

It should be appreciated, however, that the present disclosure is not limited to any specific beverage dispenser 100, and in other exemplary embodiments, beverage dispenser 100 may have any other suitable configuration. In addition, as will be understood by those skilled in the art and as used herein, the term "water" includes purified water and solutions or mixtures containing water and, e.g., elements (such as calcium, chlorine, and fluorine), salts, nitrates, organics and other chemical compounds or substances.

As will be explained in greater detail below, and as is depicted in phantom in FIG. 1, a filter assembly 120 is positioned in reservoir 108 and attached to a fitting 122 of reservoir 108. Filter assembly 120 is generally provided to remove contaminants and particles in the water in reservoir 108 through, e.g., mechanical filtration and/or absorption of such contaminants.

Figure 2:
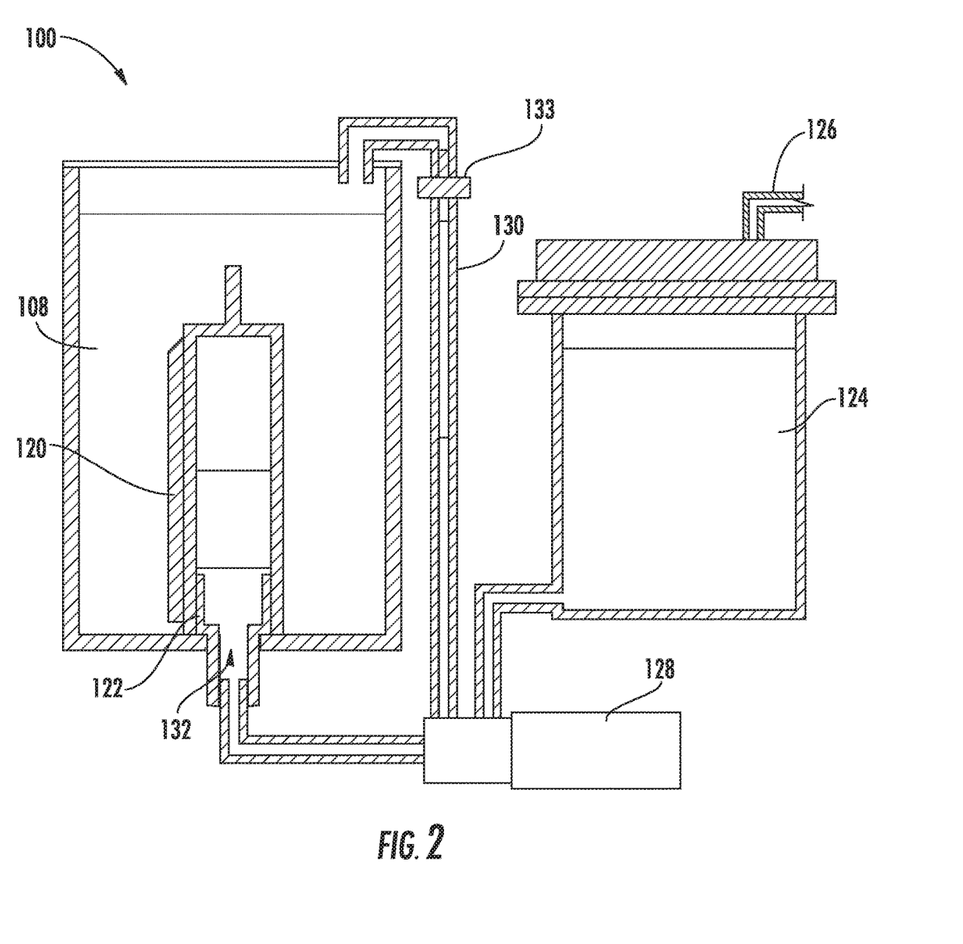
FIG. 2 provides a schematic diagram of a portion of the exemplary beverage dispenser of FIG. 1.

Referring now to FIG. 2, a schematic diagram is provided of a portion of beverage dispenser 100 of FIG. 1. As shown in FIG. 2, beverage dispenser 100 includes a hot water chamber 124 and a pump 128. Hot water chamber 124 is configured to provide dispenser portion 104 with heated water via a conduit 126. Additionally, pump 128 is in flow communication with reservoir 108 and is configured to provide a flow of water from reservoir 108 to hot water chamber 124 when activated. Pump 128 may be a centrifugal pump, or alternatively may be any other suitable pump. A priming vent 130 is provided in flow communication with pump 128 and reservoir 108 for providing a flow of water from pump 128 to reservoir 108 during a priming operation of pump 128. More particularly, priming vent 130 is provided to allow a pump head (not shown) of pump 128 to flood with water during priming operations.

Filter assembly 120 is positioned in reservoir 108 and attached to fitting 122 in reservoir 108. More particularly, reservoir 108 defines an outlet 132 fluidly connected to hot water chamber 124 via pump 128 for providing water to hot water chamber 124. During operation of beverage dispenser 100, pump 128 may draw water from reservoir 108, through filter assembly 120, and provide such water to hot water chamber 124. Water from hot water chamber 124 may then be provided to dispenser portion 104, wherein such water may be brewed or mixed with contents of any capsules or pods positioned therein. As previously discussed, the desired beverage may then be dispensed via dispenser portion 104 to a user.

During operation, if a pressure drop across filter assembly 120 is greater than a certain threshold, fluid may be pulled from priming vent 130 as opposed to reservoir 108. The fluid may initially be water, however, it may also include air. If such fluid is allowed to be so pulled from priming vent 130 to pump 128 such that air is provided to pump 128, the air may cause pump 128 to cavitate and not operate properly. Accordingly, in certain exemplary embodiments of the present disclosure, beverage dispenser 100 may further include a one-way valve 133 positioned in priming vent 130 for preventing a flow of fluid in a flow direction away from reservoir 108 through priming vent towards pump 128. One-way valve 133 may have any suitable configuration. Inclusion of one-way valve 133 may allow for proper operation of beverage dispenser 100, or more particularly proper operation of pump 128, regardless of a pressure drop across filter assembly 120 greater than a certain threshold.

Figure 3:
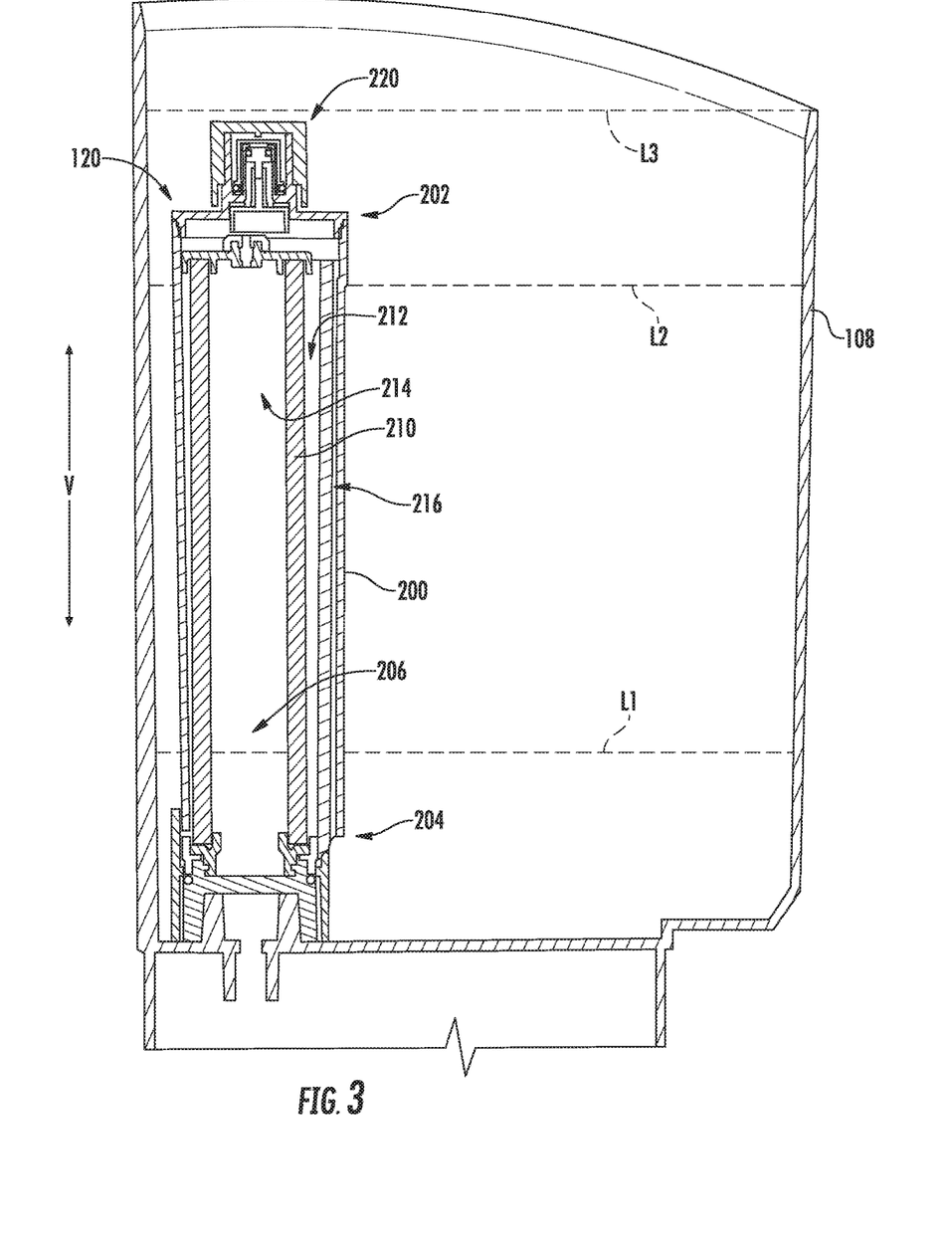
FIG. 3 provides a section view of a reservoir and filter assembly of the exemplary beverage dispenser of FIG. 1.

FIG. 3 provides a section view of reservoir 108 and filter assembly 120. As shown in FIG. 3, filter assembly 120 includes a casing 200. Casing 200 extends between a top portion 202 and a bottom portion 204, e.g., along a vertical direction V. Thus, top portion 202 of casing 200 is positioned above bottom portion 204 of casing 200 along the vertical direction V. Casing 200 also defines an interior chamber 206. Interior chamber 206 may extend between top and bottom portions 202, 204 of casing 200 within casing 200. Casing 200 may also have a circular cross-section, e.g., in a plane that is perpendicular to the vertical direction V.

Filter assembly 120 also includes a filter medium 210. Filter medium 210 is disposed within interior chamber 206 of casing 200. Filter medium 210 is configured for adsorbing or blocking contaminants within water flowing through filter medium 210 in order to filter such water. Thus, filter medium 210 may be disposed between an unfiltered volume 212 and a filtered volume 214 of interior chamber 206. In particular, filter medium 210 may divide interior chamber 206 of casing 200 between unfiltered volume 212 and filtered volume 214. Water may flow through filter medium 210 from unfiltered volume 212 to filtered volume 214 such that filter medium 210 filters such water. It should be understood that "filtered volume" and "unfiltered volume" are used herein to describe filtering of fluid within filter assembly 120 relative to filter medium 210. In alternative exemplary embodiments, filter assembly 120 may include additional filters that pre-filter water within unfiltered volume 212 prior to such water flowing through filter medium 210 to filtered volume 214.

As shown in FIG. 3, casing 200 also defines an inlet conduit 216. An entrance of inlet conduit 216 is positioned at or adjacent bottom portion 204 of casing 200. Conversely, an exit of inlet conduit 216 is positioned at or adjacent top portion 202 of casing 200. Inlet conduit 216 extends between and is contiguous with reservoir 108 and interior chamber 206 of casing 200 (e.g., unfiltered volume 212). Thus, water in reservoir 108 may enter inlet conduit 216 at bottom portion 204 of casing 200 and flow through inlet conduit 216 to top portion 202 of casing 200. The water within inlet conduit 216 may then flow into unfiltered volume 212 of interior chamber 206. In such a manner, water from a bottom portion of reservoir 108 may flow through inlet conduit 216 into unfiltered volume 212 of interior chamber 206 at or adjacent top portion 202 of casing 200.

Filter assembly 120 also includes a vent system 220. Vent system 220 is configured for venting casing 200. Thus, vent system 220 may allow air within interior chamber 206 at top portion 202 of casing 200 to flow out of casing 200 via vent system 220. By venting casing 200, performance of filter assembly 120 may be improved. For example, air trapped within casing 200 occupies a portion of the interior chamber 206. Thus, water does not completely fill interior chamber 206, and a portion of the filter medium 210 may be exposed to air rather than water. In such a manner, an effective filtering area of filter medium 210 may be reduced if air is trapped within interior chamber 206. Vent system 220 may vent interior chamber 206 in order to increase the effective filtering area of filter medium 210. Vent system 220 is discussed in greater detail below.

Figure 4:
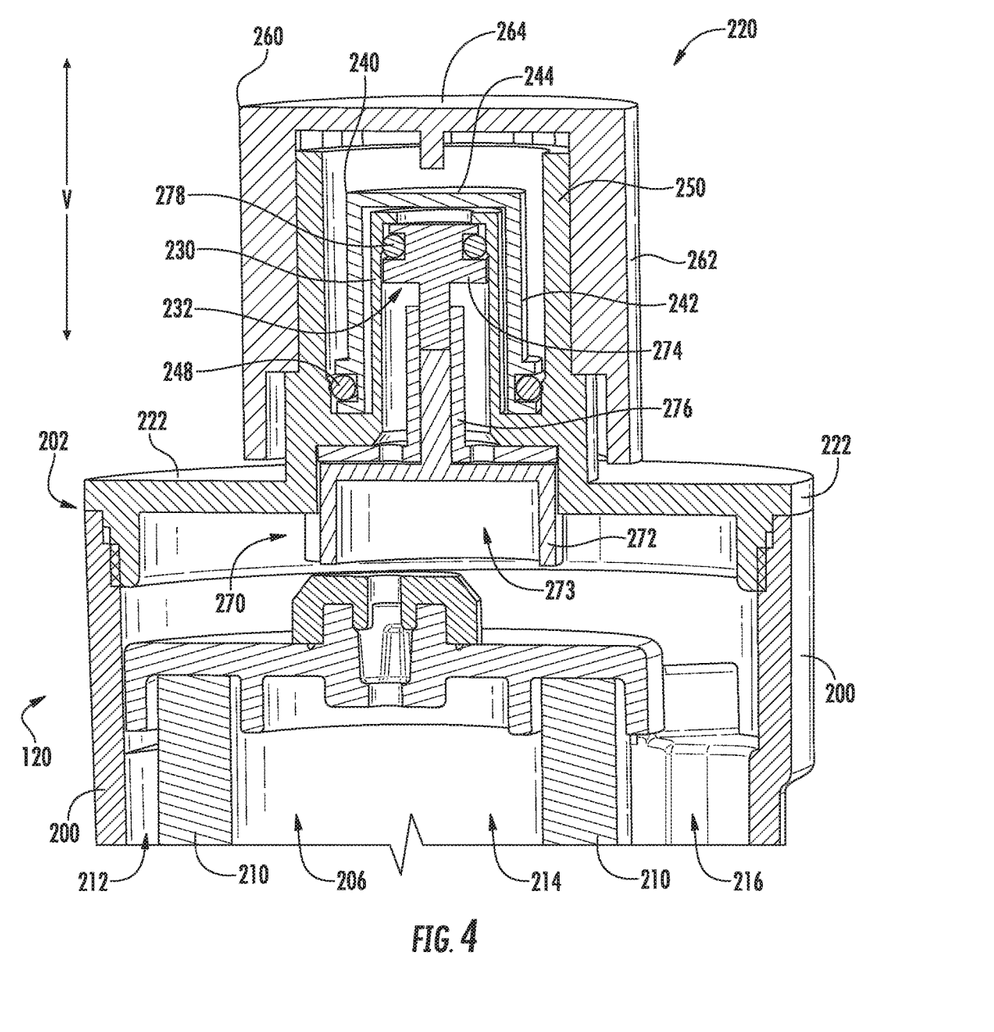
FIGS. 4 and 5 provide section views of a vent system of the filter assembly of FIG. 3.
Figure 5:
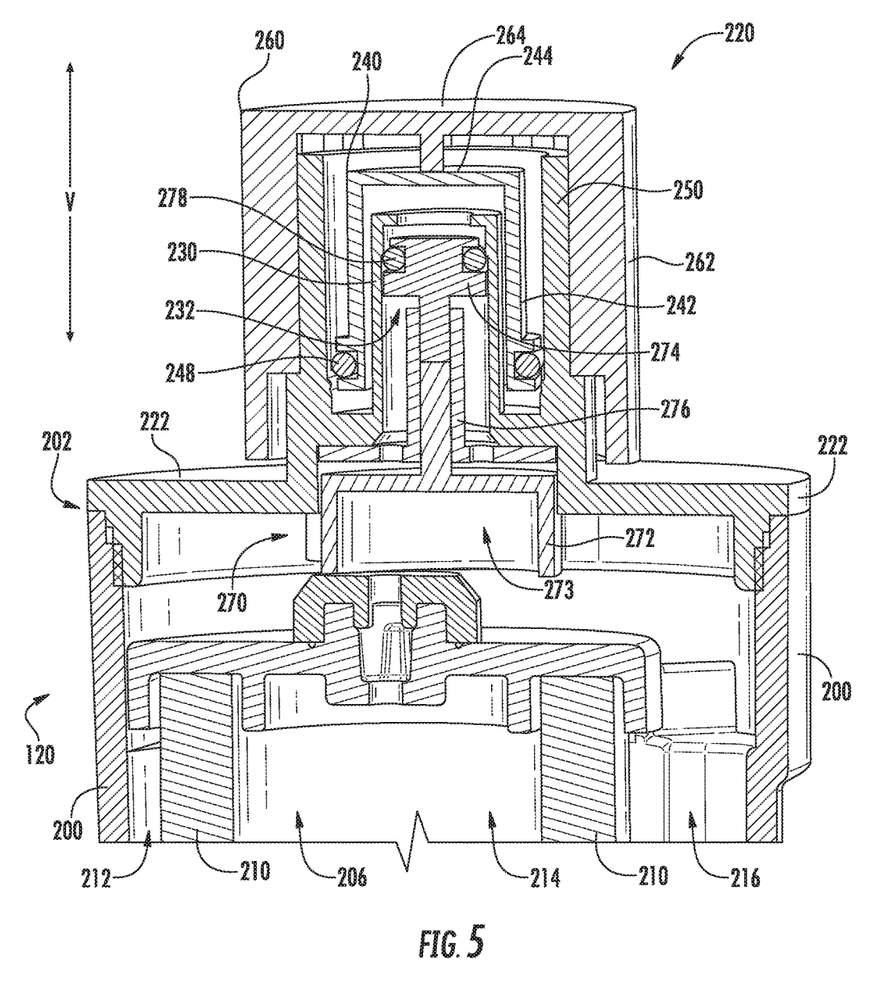

FIGS. 4 and 5 provide section views of vent system 220. As shown in FIG. 4, vent system 220 includes an inner standpipe 230, an outer check valve 240, an outer standpipe 250, a cover 260 and an inner check valve 270. The inner standpipe 230, outer check valve 240, outer standpipe 250, cover 260 and inner check valve 270 cooperate to vent air from interior chamber 206 of casing 200 while also limiting or preventing water flow into interior chamber 206 of casing 200 through vent system 220.

Inner standpipe 230 defines a channel 232. Channel 232 of inner standpipe 230 is contiguous with interior chamber 206 of casing 200. Thus, air within interior chamber 206 of casing 200 may flow into channel 232 of inner standpipe 230. Inner standpipe 230 may have a circular cross-section, e.g., in a plane that is perpendicular to the vertical direction V. Thus, inner standpipe 230 may be cylindrical, e.g., with an open top.

Outer check valve 240 is positioned on or over inner standpipe 230. In particular, outer check valve 240 includes a sidewall 242 and an end wall 244. Sidewall 242 of outer check valve 240 extends around inner standpipe 230. For example, an inner surface 245 of sidewall 242 of outer check valve 240 may be positioned on and/or face inner standpipe 230, e.g., an outer surface of inner standpipe 230 positioned opposite channel 232 of inner standpipe 230. Thus, sidewall 242 of outer check valve 240 may be disposed opposite channel 232 of inner standpipe 230 about inner standpipe 230 such that inner standpipe 230 is disposed between channel 232 of inner standpipe 230 and sidewall 242 of outer check valve 240. End wall 244 of outer check valve 240 is mounted to (e.g., integrally formed with) sidewall 242 of outer check valve 240. e.g., such that end wall 244 of outer check valve 240 is positioned over inner standpipe 230.

Outer check valve 240 is movable along the vertical direction V on inner standpipe 230 between an open position (shown in FIG. 5) and a closed position (shown in FIG. 4). In the open position, outer check valve 240 permits air flow out of interior chamber 206 of casing 200 via channel 232 of inner standpipe 230. Conversely, outer check valve 240 blocks air flow from interior chamber 206 of casing 200 via channel 232 of inner standpipe 230 in the closed position. As shown in FIGS. 4 and 5, end wall 244 of outer check valve 240 may be positioned on or contact inner standpipe 230 when outer check valve 240 is in the closed position. Conversely, outer check valve 240 may move upwardly along the vertical direction V from the closed position to the open position, e.g., such that end wall 244 of outer check valve 240 is positioned above or spaced apart from inner standpipe 230 in the open position.

Outer check valve 240 may also include an O-ring or seal 248 mounted outer check valve 240 at sidewall 242 of outer check valve 240. Seal 248 may extend around sidewall 242 of outer check valve 240. In addition, seal 248 may extend between sidewall 242 of outer check valve 240 and outer standpipe 250 when outer check valve 240 is in the closed position. In such a manner, seal 248 may assist with hindering or blocking air flow from interior chamber 206 of casing 200 via channel 232 of inner standpipe 230 when outer check valve 240 is in the closed position.

Figure 7:
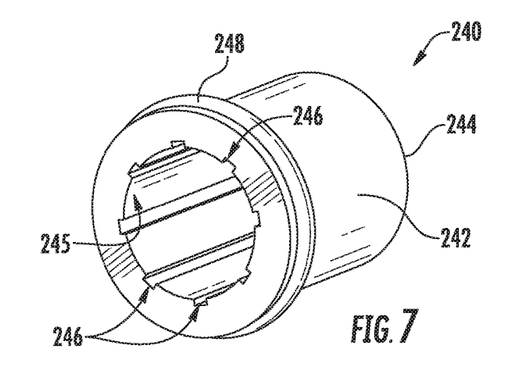

FIG. 7 provides a bottom, perspective view of outer check valve 240. As shown in FIG. 7, sidewall 242 of outer check valve 240 may have a circular cross-section, e.g., in a plane that is perpendicular to the vertical direction V. Thus, sidewall 242 of outer check valve 240 may be cylindrical. Further, a shape of sidewall 242 of outer check valve 240 may be complementary to a shape of inner standpipe 230 such that inner standpipe 230 may be received within sidewall 242 of outer check valve 240.

Sidewall 242 of outer check valve 240 may also define passages 246 that extend along the vertical direction V on inner surface 245 of sidewall 242 of outer check valve 240. Air from channel 232 of inner standpipe 230 may flow through outer check valve 240 within passages 246. Thus, inner surface 245 of sidewall 242 of outer check valve 240 may contact and slide on inner standpipe 230 when outer check valve 240 shifts between the open and closed positions, and passages 246 may provide conduits for air flow out of channel 232 of inner standpipe 230 when outer check valve 240 is in the open position. Passages 246 may be circumferentially distributed at inner surface 245 of sidewall 242.

Turning back to FIGS. 4 and 5, outer standpipe 250 is spaced apart from inner standpipe 230, e.g., with sidewall 242 of outer check valve 240 disposed between outer standpipe 250 and inner standpipe 230 along a direction that is perpendicular to the vertical direction V. Outer standpipe 250 may extend around sidewall 242 of outer check valve 240. Thus, outer check valve 240 may be disposed within outer standpipe 250. Outer standpipe 250 may have a circular cross-section, e.g., in a plane that is perpendicular to the vertical direction V. Thus, outer standpipe 250 may be cylindrical, e.g., with an open top.

Figure 8:
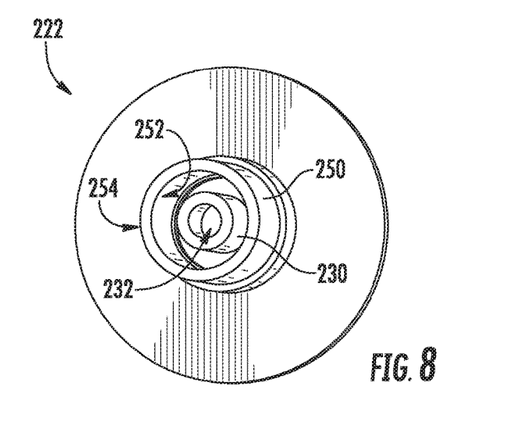

FIG. 8 provides a top, perspective view of a cap 222 of vent system 220. Cap 222 may be mounted to casing 200 at top portion 202 of casing 200 in order to seal interior chamber 206 of casing 200. Cap 222 may also be integrally formed with casing 200 such that cap 222 and casing 200 are formed of or with a common piece of material, such as molded plastic. Thus, cap 222 may form a portion of casing 200 in certain exemplary embodiments.

Inner standpipe 230 and outer standpipe 250 may be mounted to cap 222. In particular, inner standpipe 230 and outer standpipe 250 may be integrally formed with cap 222 from a common piece of material, such as molded plastic. Thus, inner standpipe 230 and outer standpipe 250 may be integrally formed from a common piece of material. In alternative exemplary embodiments, inner standpipe 230 and outer standpipe 250 may be separate pieces of material mounted (e.g., fastened, adhered, interference fit, spun weld, etc.) to cap 222 and/or each other. As shown in FIG. 9, inner and outer standpipes 230, 250 may also be concentrically positioned relative to each other.

Turning back to FIGS. 4 and 5, cover 260 is positioned on or over outer standpipe 250. In particular, cover 260 includes a sidewall 262 and an end wall 264. Sidewall 262 of cover 260 extends around outer standpipe 250. For example, an inner surface 266 of sidewall 262 of cover 260 may be positioned on and/or face outer standpipe 250, e.g., an outer surface 254 of outer standpipe 250. Cover 260 may be mounted to outer standpipe 250 in certain exemplary embodiments, e.g., with fasteners, adhesive, spin welding, interference fit, etc. End wall 264 of cover 260 is mounted to (e.g., integrally formed with) sidewall 262 of cover 260, e.g., such that end wall 264 of cover 260 is positioned over outer standpipe 250.

Figure 6:
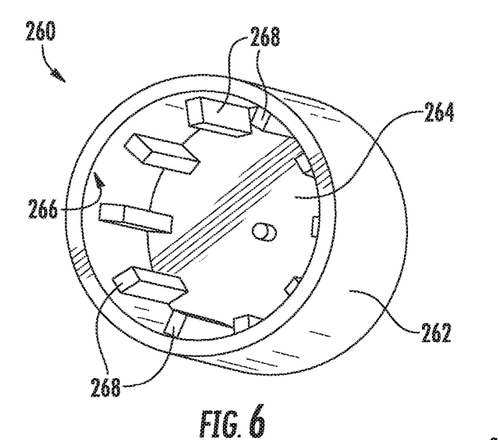
FIGS. 6, 7 and 8 provide perspective views of various components of the vent system of FIG. 4.

FIG. 6 provides a bottom, perspective view of cover 260. As may be seen in FIG. 6, sidewall 262 of cover 260 may have a circular cross-section, e.g., in a plane that is perpendicular to the vertical direction V. Thus, sidewall 262 of cover 260 may be cylindrical. Further, a shape of sidewall 262 of cover 260 may be complementary to a shape of outer standpipe 250 such that outer standpipe 250 may be received within sidewall 262 of cover 260.

Cover 260 also includes a plurality of projections or ribs 268. Ribs 268 are positioned on sidewall 262 of cover 260 at inner surface 266 of cover 260. Ribs 268 extend from sidewall 262 of cover 260 towards outer standpipe 250. In particular, ribs 268 may extend to outer standpipe 250 such that ribs 268 contact outer standpipe 250. Ribs 268 may be spaced apart from each other on sidewall 262 of cover 260. For example, ribs 268 may be uniformly distributed on sidewall 262 of cover 260. Thus, air exiting outer check valve 240 when outer check valve 240 is in the open position may flow between ribs 268 out of vent system 220.

Operation of vent system 220 and outer check valve 240 is discussed in greater detail below in the context of FIG. 3. As shown in FIG. 3, reservoir 108 may be filled to various levels with water. During initial filling of reservoir 108, a user may pour or direct water into reservoir 108 until reservoir 108 is filled with water to level L1. With reservoir 108 filled with water to level L1, a height of water within filter assembly 120 may also correspond to level L1 and air may fill filter assembly 120 above level L1. As the user continues to fill reservoir 108 with water from level L1 to level L2, positive pressure within interior chamber 206 of casing 200, due to the additional water being directed into reservoir 108, may open outer check valve 240, e.g., by lifting outer check valve 240 from the closed position to the open position, such that air within interior chamber 206 of casing 200 is purged via venting system 220. As the user continues to fill reservoir 108 with water from level L2 to level L3, the positive pressure within interior chamber 206 of casing 20X) may taper off and outer check valve 240 may close, e.g., fall from the open position to the closed position. In addition, a pocket of air may be trapped within cover 260 when water fills reservoir 108 to level L3, e.g., such that outer check valve 240 is kept dry even when filter assembly 120 is submerge in reservoir 108.

With water filling reservoir 108 to level L3, a user may activate beverage dispenser 100. When pump 128 is activated, pump 128 draws water from interior chamber 206 of casing 200. Thus, pump 128 may generate negative pressure within interior chamber 206 of casing 200. In turn the negative pressure within interior chamber 206 of casing 200 may shift outer check valve 240 closed. Thus, water within reservoir 108 may not be drawn through vent system 220 into interior chamber 206 of casing 200 when pump 128 is activated and water fills reservoir 108 to level L3 due to outer check valve 240 being in the closed position. Similarly, air within reservoir 108 may not be drawn through vent system 220 into interior chamber 206 of casing 200 when pump 128 is activated and water fills reservoir 108 to level L2 due to outer check valve 240 being in the closed position. In such a manner, outer check valve 240 may block or limit fluid flow into interior chamber 206 of casing 200 via channel 232 of inner standpipe 230, e.g., such that interior chamber 206 of casing 200 remains filled with water after filling reservoir 108 to level L3 regardless of the level of water within reservoir 108.

Turning back to FIGS. 4 and 5, vent system 220 also includes an inner check valve 270. Inner check valve 270 includes a float 272, a valve body 274 and a retainer 276. Float 272 is positioned at interior chamber 206 of casing 200. In addition, float 272 may define an air pocket 273 at a bottom portion of float 272. The air pocket 273 may be contiguous with interior chamber 206 of casing 200. Thus, float 272 may be buoyant such that float 272 rises with a water level within interior chamber 206 of casing 200. Valve body 274 is mounted (e.g., adhered, spun weld, fastened, etc.) to float 272. Valve body 274 may also be positioned within channel 232 of inner standpipe 230, and retainer 276 may be positioned at channel 232 of inner standpipe 230 and may be mounted to (e.g., adhered, spun weld, fastened, etc.) to inner standpipe 230.

Float 272 and/or valve body 274 may be movable along the vertical direction V relative to retainer 276. Thus, as shown in FIGS. 4 and 6, inner check valve 270 may adjust between an open position (shown in FIG. 5) and a closed position (shown in FIG. 4). Valve body 274 may block water flow from interior chamber 206 of casing 200 into channel 232 of inner standpipe 230 when inner check valve 270 is in the closed position. Conversely, valve body 274 may be positioned to permit fluid flow from interior chamber 206 of casing 200 into channel 232 of inner standpipe 230 when inner check valve 270 is in the open position.

As discussed above, float 272 may be coupled to valve body 274. Thus, as water fills interior chamber 206 of casing 200, float 272 may lift valve body 274 upwardly in channel 232 of inner standpipe 230, e.g., until valve body 274 impacts a step at a top portion of inner standpipe 230, as shown in FIG. 4. Thus, inner check valve 270 is configured for blocking fluid flow out of interior chamber 206 of casing 200 into channel 232 of inner standpipe 230, e.g., when interior chamber 206 of casing 200 is filled with water.

Inner check valve 270 may also close when filter assembly 120 is inverted. As an example, a user may flush filter assembly 120 with tap water prior to installing filter assembly 120 within reservoir 108. When filter medium 210 is a carbon block or includes activated carbon, inner check valve 270 blocks carbon from filter medium 210 from flowing out of interior chamber 206 of casing 200 to outer check valve 240 where the carbon could potentially clog outer check valve 240. Thus, cover 260 and inner check valve 270 may assist with keeping outer check valve 240 dry and properly operating.

Inner check valve 270 may include an O-ring or seal 278. Seal 278 may be mounted to or positioned on valve body 274. In particular, seal 278 may extend around valve body 274, and seal 278 may also extend between valve body 274 and inner standpipe 230, e.g., when inner check valve 270 is in the closed position. In such a manner, seal 278 may assist with hindering or blocking water flow from interior chamber 206 of casing 200 via channel 232 of inner standpipe 230 when inner check valve 270 is in the closed position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A filter assembly, comprising:
   a casing extending between a top portion and a bottom portion, the casing defining an interior chamber;
   a filter medium disposed within the interior chamber of the casing;
   a vent system positioned at the top portion of the casing, the vent system comprising
      an inner standpipe defining a channel that is contiguous with the interior chamber of the casing;
      an outer check valve comprising a sidewall and an end wall, the sidewall of the outer check valve extending around the inner standpipe such that the inner standpipe is at least partially received within the sidewall of the outer check valve, the end wall of the outer check valve mounted to the sidewall of the outer check valve such that the end wall of the outer check valve is positioned over the inner standpipe;
      an outer standpipe extending around the sidewall of the outer check valve;
      a cover comprising a sidewall and an end wall, the sidewall of the cover extending around the outer standpipe, the end wall of the cover mounted to the sidewall of the cover such that the end wall of the cover is positioned over the outer standpipe; and
      an inner check valve, the inner check valve comprising:
         a float positioned at the interior chamber of the casing;
         a valve body mounted to the float and positioned within the channel of the inner standpipe; and
         a retainer mounted to the inner standpipe, the valve body vertically movable on the retainer such that the inner check valve is adjustable between an open position and a closed position, the valve body blocking fluid flow from the interior chamber of the casing via the channel of the inner standpipe when the inner check valve is in the closed position.

2. The filter assembly of claim 1, wherein the outer check valve is vertically movable on the inner standpipe between an open position and a closed position, the outer check valve blocking fluid flow from the interior chamber of the casing via the channel of the inner standpipe when the outer check valve is in the closed position.

3. The filter assembly of claim 2, wherein the vent system further comprises an O-ring mounted to the outer check valve at the sidewall of the outer check valve such that the O-ring extends around the sidewall of the outer check valve, the O-ring extending between the sidewall of the outer check valve and the outer standpipe when the outer check valve is in the closed position.

4. The filter assembly of claim 1, wherein the cover comprises a plurality of ribs positioned on the sidewall of the cover such that the ribs of the plurality of ribs extend from the sidewall of the cover towards the outer standpipe.

5. The filter assembly of claim 4, wherein the ribs of the plurality of ribs are uniformly distributed on the sidewall of the cover.

6. The filter assembly of claim 1, wherein the inner check valve further comprises an O-ring mounted to the valve body such that the O-ring extends around the valve body, the O-ring extending between the valve body and the inner standpipe when the inner check valve is in the closed position.

7. The filter assembly of claim 1, wherein the float defines an air pocket at a bottom portion of the float, the air pocket of the float contiguous with the interior chamber of the casing.

8. The filter assembly of claim 1, wherein the inner standpipe and the outer standpipe are integrally formed from a common piece of material.

9. The filter assembly of claim 8, further comprising a cap mounted to the casing at the top portion of the casing, the inner standpipe and the outer standpipe integrally formed with the cap from the common piece of material.

10. The filter assembly of claim 1, wherein the inner standpipe, outer check valve, outer standpipe and cover are nested such that the inner standpipe is disposed within the outer check valve, the outer check valve is disposed within the outer standpipe, and the outer standpipe is disposed within the cover.

11. The filter assembly of claim 10, wherein the inner standpipe, the sidewall of the outer check valve, the outer standpipe, and the sidewall of the cover are cylindrical.

12. A filter assembly, comprising:
    a casing defining an interior chamber;
    a filter medium disposed within the interior chamber of the casing;
    a vent system mounted to the casing, the vent system comprising
       an inner standpipe defining a channel in fluid communication with the interior chamber of the casing;
       an outer standpipe spaced apart from the inner standpipe;
       an outer check valve comprising a sidewall and an end wall, an inner surface of the sidewall of the outer check valve facing the inner standpipe such that the inner standpipe is at least partially received within the sidewall of the outer check valve, the end wall of the outer check valve mounted to the sidewall of the outer check valve and positioned over the inner standpipe, the sidewall of the outer check valve disposed between the inner standpipe and the outer standpipe;
       a cover comprising a sidewall and an end wall, an inner surface of the sidewall of the cover facing an outer surface of the outer standpipe, the end wall of the cover mounted to the sidewall of the cover and positioned over the outer standpipe; and
       an inner check valve, the inner check valve comprising:
          a float positioned at the interior chamber of the casing;
          a valve body mounted to the float and positioned within the channel of the inner standpipe; and
          a retainer mounted to the inner standpipe, the valve body vertically movable on the retainer such that the inner check valve is adjustable between an open position and a closed position, the valve body blocking fluid flow from the interior chamber of the casing via the channel of the inner standpipe when the inner check valve is in the closed position.

13. The filter assembly of claim 12, wherein the outer check valve is vertically movable on the inner standpipe between an open position and a closed position, the outer check valve blocking fluid flow from the interior chamber of the casing via the channel of the inner standpipe when the outer check valve is in the closed position.

14. The filter assembly of claim 13, wherein the vent system further comprises an O-ring mounted to the outer check valve at the sidewall of the outer check valve such that the O-ring extends around the sidewall of the outer check valve, the O-ring extending between the sidewall of the outer check valve and the outer standpipe when the outer cheek valve is in the closed position.

15. The filter assembly of claim 12, wherein the cover comprises a plurality of ribs positioned on the sidewall of the cover such that the ribs of the plurality of ribs extend from the inner surface of the sidewall of the cover towards the outer standpipe.

16. The filter assembly of claim 15, wherein the ribs of the plurality of ribs are uniformly distributed on the sidewall of the cover.

17. The filter assembly of claim 12, wherein the inner check valve further comprises an O-ring mounted to the valve body such that the O-ring extends around the valve body, the O-ring extending between the valve body and the inner standpipe when the inner check valve is in the closed position.

18. The filter assembly of claim 12, wherein the float defines an air pocket at a bottom portion of the float, the air pocket of the float contiguous with the interior chamber of the casing.

19. The filter assembly of claim 12, wherein the inner standpipe and the outer standpipe are integrally formed from a common piece of material.

20. The filter assembly of claim 19, further comprising a cap mounted to the casing at a top portion of the casing, the inner standpipe and the outer standpipe integrally formed with the cap from the common piece of material.

21. The filter assembly of claim 12, wherein the inner standpipe, outer check valve, outer standpipe and cover are nested such that the inner standpipe is disposed within the outer check valve, the outer check valve is disposed within the outer standpipe, and the outer standpipe is disposed within the cover.

22. The filter assembly of claim 21, wherein the inner standpipe, the sidewall of the outer check valve, the outer standpipe, and the sidewall of the cover are cylindrical.

* * * * *